(12) United States Patent
Lien (10) Patent No.: US 11,079,866 B2
(45) Date of Patent: Aug. 3, 2021

(54) COMPUTER MICE, COMPUTER MOUSE ARRANGEMENTS AND MOUSE PAD ARRANGEMENTS

(71) Applicant: RAZER (ASIA-PACIFIC) PTE. LTD., Singapore (SG)

(72) Inventor: Jian Yao Lien, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 16/484,779

(22) PCT Filed: Feb. 17, 2017

(86) PCT No.: PCT/SG2017/050074
§ 371 (c)(1),
(2) Date: Aug. 8, 2019

(87) PCT Pub. No.: WO2018/151666
PCT Pub. Date: Aug. 23, 2018

(65) Prior Publication Data
US 2020/0012357 A1    Jan. 9, 2020

(51) Int. Cl.
| | |
|---|---|
| *G09G 5/08* | (2006.01) |
| *G06F 3/039* | (2013.01) |
| *G06F 1/16* | (2006.01) |
| *G06F 3/01* | (2006.01) |
| *G06F 3/03* | (2006.01) |
| *G06F 3/0354* | (2013.01) |

(52) U.S. Cl.
CPC ............ *G06F 3/039* (2013.01); *G06F 1/1656* (2013.01); *G06F 3/016* (2013.01); *G06F 3/0317* (2013.01); *G06F 3/03543* (2013.01)

(58) Field of Classification Search
CPC .... G06F 3/03543; G06F 3/038; G06F 3/0383; G06F 3/016; G06F 3/0317; G06F 16/00; G06F 21/34
USPC .................................................. 346/163, 156
See application file for complete search history.

(56) References Cited

U.S. PATENT DOCUMENTS

| | | |
|---|---|---|
| 4,868,549 A | 9/1989 | Affinito et al. |
| 5,818,427 A | 10/1998 | Stromberg |
| 6,100,874 A | 8/2000 | Schena et al. |

(Continued)

FOREIGN PATENT DOCUMENTS

| | | |
|---|---|---|
| CN | 201054126 Y | 4/2008 |
| CN | 105630209 A | 6/2016 |

(Continued)

OTHER PUBLICATIONS

Extended European Search Report dated Jan. 13, 2020, 12 pages, for the corresponding European Patent Application No. 17896955.6.

(Continued)

*Primary Examiner* — Jennifer T Nguyen
(74) *Attorney, Agent, or Firm* — Polsinelli PC (57) ABSTRACT

According to various embodiments, there is provided a computer mouse movable relative to a tracking surface on which the computer mouse is placed, the computer mouse including: a housing; a magnetic element provided on the housing; and a control circuit configured to control a magnetic attraction force between the magnetic element and a ferromagnetic material on the tracking surface.

19 Claims, 7 Drawing Sheets

(56) References Cited

U.S. PATENT DOCUMENTS

| | | | |
|---|---|---|---|
| 6,504,528 B1* | 1/2003 | Kermani | G06F 3/016 |
| | | | 345/156 |
| 7,009,597 B1 | 3/2006 | Ames | |
| 8,139,030 B2 | 3/2012 | Zhao et al. | |
| 8,188,974 B2 | 5/2012 | Bidiville et al. | |
| 8,997,009 B2 | 3/2015 | Bechtel | |
| 9,048,044 B2 | 6/2015 | Chiang | |
| 9,128,508 B2 | 9/2015 | Tang | |
| 2005/0231470 A1 | 10/2005 | Sugino et al. | |
| 2005/0275629 A1* | 12/2005 | Chin | G06F 3/03543 |
| | | | 345/163 |
| 2006/0001657 A1 | 1/2006 | Monney et al. | |
| 2006/0132440 A1 | 6/2006 | Safai | |
| 2007/0069096 A1 | 3/2007 | VonHeck | |
| 2007/0097078 A1* | 5/2007 | Chin | G06F 3/0317 |
| | | | 345/166 |
| 2008/0111791 A1* | 5/2008 | Nikittin | G06F 3/016 |
| | | | 345/163 |
| 2011/0028194 A1* | 2/2011 | Tang | G06F 3/03543 |
| | | | 463/1 |
| 2011/0122064 A1 | 5/2011 | Deng | |
| 2016/0085322 A1* | 3/2016 | Park | G06F 1/266 |
| | | | 345/163 |
| 2017/0256977 A1* | 9/2017 | Sauterel | H02J 50/90 |
| 2017/0357403 A1* | 12/2017 | Geary | G06F 3/0488 |

FOREIGN PATENT DOCUMENTS

| | | |
|---|---|---|
| DE | 4400790 A1 | 5/1995 |
| GB | 2 286 034 A | 8/1995 |
| JP | 07-104932 A | 4/1995 |
| JP | 2009-251995 A | 10/2009 |
| KR | 10-0510969 B1 | 8/2005 |
| TW | M416135 U | 11/2011 |
| TW | 201421301 A | 6/2014 |

OTHER PUBLICATIONS

Kasun Karunanayaka, et al., "Magnetic Field Based Near Surface Haptic and Pointing Interface", KEIO NUS Cute Center, Interactive and Digital Media Institute, National University of Singapore, Singapore in 10 pages.

International Search Report and Written Opinion, dated Nov. 16, 2017, for the corresponding International Application No. PCT/SG2017/050074 in 14 pages.

Tara Brady "Magic mouse floats' above the desk and will stop your wrist hurting after hours at the computer", published Mar. 10, 2013, available online at http://www.dailymail.co.uk/sciencetech/article-2291259/Magic-mouse-floats-desk-stop-wrist-hurting-hours-computer.html in 4 pages.

"Revolutionary novel gliding mechanism—no traction, no noise", available online at www.dellemann.net/computermouse-gliding.htm in 1 page.

\* cited by examiner

COMPUTER MICE, COMPUTER MOUSE ARRANGEMENTS AND MOUSE PAD ARRANGEMENTS

TECHNICAL FIELD

Various embodiments relate to computer mice, computer mouse arrangements, mouse pads, mouse pad arrangements and methods for adjusting a glide force threshold of a computer mouse.

BACKGROUND

A computer mouse is an input device that can be used to control the position of a pointer displayed on a computing device. The computer mouse may be placed onto a tracking surface, such as a mouse pad or a table top, and may be shifted or glided on the tracking surface. The movement of the computer mouse relative to the tracking surface may be translated into a corresponding movement of the pointer. The ease of gliding the computer mouse, in other words, the glide force required to glide the computer mouse, may depend on the frictional force between a bottom surface of the computer mouse and the tracking surface.

SUMMARY

According to various embodiments, there may be provided a computer mouse movable relative to a tracking surface on which the computer mouse is placed, the computer mouse including: a housing; a magnetic element provided on the housing; and a control circuit configured to control a magnetic attraction force between the magnetic element and a ferromagnetic material on the tracking surface.

According to various embodiments, there may be provided a computer mouse arrangement, including: a ferromagnetic material on a tracking surface; and a computer mouse movable relative to the tracking surface on which the computer mouse is placed, the computer mouse including a housing, a magnetic element provided on the housing, and a control circuit configured to control a magnetic attraction force between the magnetic element and the ferromagnetic material on the tracking surface.

According to various embodiments, there may be provided a mouse pad arrangement including: a computer mouse including a housing and a ferromagnetic material on the housing; and a mouse pad for arranging under the computer mouse, the mouse pad including a magnetic layer and a control circuit configured to control a magnetic attraction force between the magnetic layer and a ferromagnetic material on a housing of the computer mouse.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Embodiments described below in context of the devices (computer mouse, mouse pad, computer mouse arrangement and mouse pad arrangement) are analogously valid for the respective methods, and vice versa. Furthermore, it will be understood that the embodiments described below may be combined, for example, a part of one embodiment may be combined with a part of another embodiment.

It will be understood that any property described herein for a specific device may also hold for any device described herein. It will be understood that any property described herein for a specific method may also hold for any method described herein. Furthermore, it will be understood that for any device or method described herein, not necessarily all the components or steps described must be enclosed in the device or method, but only some (but not all) components or steps may be enclosed.

In this context, the computer mouse, the mouse pad or the computing device as described in this description may include a memory which is for example used in the processing carried out in the computer mouse, the mouse pad or the computing device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The term "coupled" (or "connected") herein may be understood as electrically coupled, mechanically coupled or as magnetically coupled, for example attached or fixed, or just in contact without any fixation, and it will be understood that both direct coupling or indirect coupling (in other words: coupling without direct contact) may be provided.

The reference to any conventional devices in this specification is not, and should not be taken as an acknowledgement or any form of suggestion that the referenced conventional devices form part of the common general knowledge in Australia (or any other country).

In order that the invention may be readily understood and put into practical effect, various embodiments will now be described by way of examples and not limitations, and with reference to the figures.

In the context of various embodiments, the phrase "glide force threshold" may be but is not limited to being interchangeably referred to as a "glide force requirement". Glide force threshold may be understood to be a minimal amount of force required to increase the velocity of a stationary mouse by a predetermined amount within a predetermined time, across a frictionless surface. Air resistance to the movement of the computer mouse may be assumed to be negligible. In other words, the glide force threshold may be the minimal amount of force required to overcome the inertia of the computer mouse, to achieve a predetermined acceleration. The glide force threshold may be a theoretical figure. A real glide force threshold may refer to the minimal amount of force required to increase the velocity of the stationary mouse by the predetermined amount within the predetermined time, across a tracking surface. The real glide force threshold may include the glide force threshold and the force required to overcome further resistive forces, such as a frictional force between the computer mouse and the tracking surface. Therefore, the real glide force threshold may be larger than the glide force threshold. The real glide force threshold may depend on the texture of each of the tracking surface and a surface of the computer mouse that contacts the tracking surface. The real glide force threshold may increase when the glide force threshold is increased.

In the context of various embodiments, the phrase "mouse pad" may be but is not limited to being interchangeably referred to as a "mouse mat". The mouse pad may provide a tracking surface under the computer mouse. The computer mouse may glide across the tracking surface when the computer mouse is manipulated to provide an input to a computing device coupled to the computer mouse.

In the context of various embodiments, the phrase "computer mouse" may be, but is not limited to being interchangeably referred to as a "mouse".

According to various embodiments, a computer mouse arrangement may be provided. The computer mouse arrangement may include a computer mouse and a mouse pad. At least one of the computer mouse or the mouse pad may include an adjustable magnet. The computer mouse may include the adjustable magnet while the mouse pad may include a ferromagnetic material. Alternatively, the mouse pad may include the adjustable magnet while the computer mouse may include the ferromagnetic material. The adjustable magnet may be an electromagnet or an electro-permanent magnet. The computer mouse arrangement may further include a control circuit. The control circuit may be configured to adjust a magnetic field strength of the adjustable magnet, so as to vary a magnetic attraction force between the adjustable magnet and the ferromagnetic material.

In the course of interacting with a computer application, such as a computer game, a user may wish to vary the glide force threshold according to events occurring in the computer application. For example, the user may wish to increase the glide force threshold for a finer degree of control on the computer mouse movement or may wish to reduce the glide force threshold to reduce his response time.

Various embodiments may provide for a computer mouse, a computer mouse arrangement and a method allowing an adjustment of the glide force threshold of the computer mouse.

Figure 1:
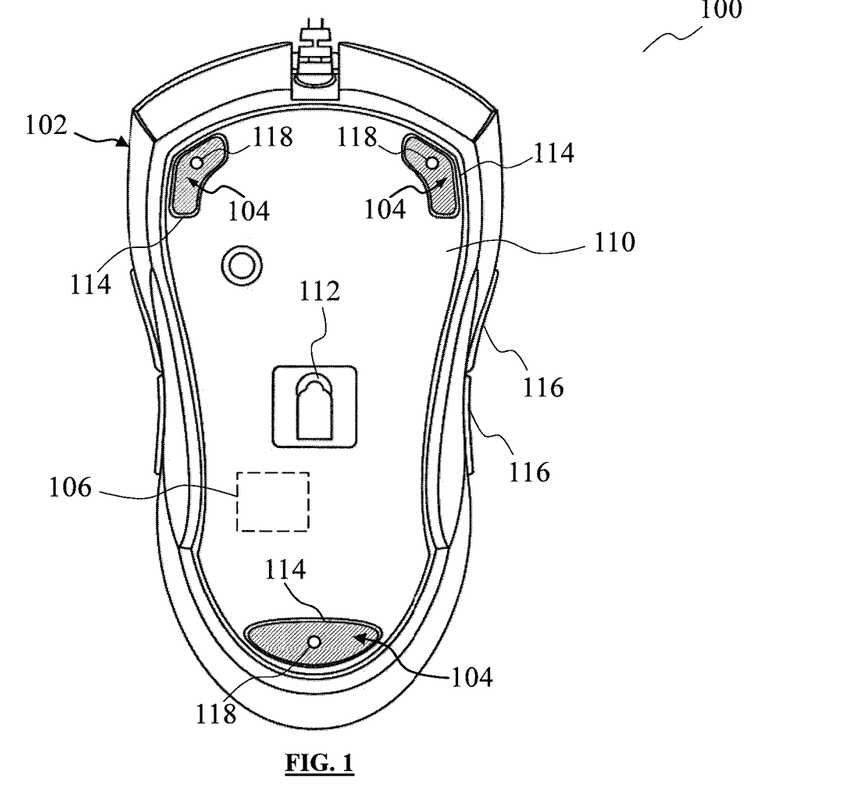
FIG. 1 shows a bottom view of a computer mouse according to various embodiments.

FIG. 1 shows a bottom view of a computer mouse 100 according to various embodiments. The computer mouse 100 may include a housing 102. The housing 102 may encase the internal components of the computer mouse 100. The internal components may include at least one of a position sensor, a control circuit 106, a processor, a memory or an electric circuit. The control circuit 106 is illustrated in dashed lines in FIG. 1 to indicate that the control circuit 106 may not be visible from the bottom view, by virtue of the control circuit 106 being an internal component. The position of the control circuit 106 as shown in FIG. 1 is merely illustrative and is not limiting as to the position of the control circuit 106. The computer mouse 100 may be any one of a mechanical mouse, an optical mouse or an inertial mouse. In other words, the position sensor may include at least one of a mechanical tracker, an optical tracker, a gyroscope or an accelerometer. The bottom view shows the bottom surface 110 of the housing 102. The bottom surface 110 may face a tracking surface when the computer mouse 100 is placed on the tracking surface. The bottom surface 110 may include an opening or a transparent or translucent portion (transparent or translucent for the wavelength(s) of the irradiation beam provided and/or detected by the position sensor) to at least partially expose the position sensor. For example, FIG. 1 shows the position sensor as being an optical tracker 112, although it would be understood that the position sensor may be any other types of position sensors. At least one mouse foot 114 may optionally be provided on the bottom surface 110. The mouse feet 114 may be protrusions that extend out of the bottom surface 110. The mouse feet 114 may contact the tracking surface when the computer mouse 100 is placed on the tracking surface. Pressure-sensitive sensors 118 may be arranged at, or embedded within, at least one mouse foot 114. The pressure-sensitive sensors 118 may provide information to the control circuit 106 on the pressure exerted on the mouse feet 114. A magnetic element 104 may be provided on each mouse foot 114 or embedded within each mouse foot 114. The magnetic element 104 may be smaller than the mouse foot 114 or at least substantially cover the mouse foot 114. The magnetic element 104 may also be provided within a base of the housing 102, or on the bottom surface 110 above of, or near where the mouse feet 114 are, so as to maximize the magnetic attraction force between the magnetic element 104 and a ferromagnetic material of the tracking surface or a mouse pad. The magnetic element 104 may be coupled to a power source such as a battery, so that the magnetic element 104 may acquire a magnetic field by virtue of receiving an electric current from the power source. A top surface (not shown) of the housing 102 may oppose the bottom surface 110. A plurality of top buttons, such as a left click button and a right click button, as well as a scroll wheel, may be provided on the top surface. Side buttons 116 may also be provided on or in a respective opening of one or more side walls of the housing 102. A user may operate any one of the top button or the side button 116 to provide a user input, for example, to make a selection or to execute an action in a computer application. The user may also operate any one of the top button or the side button 116 to provide a user input to the control circuit 106.

Figure 2:
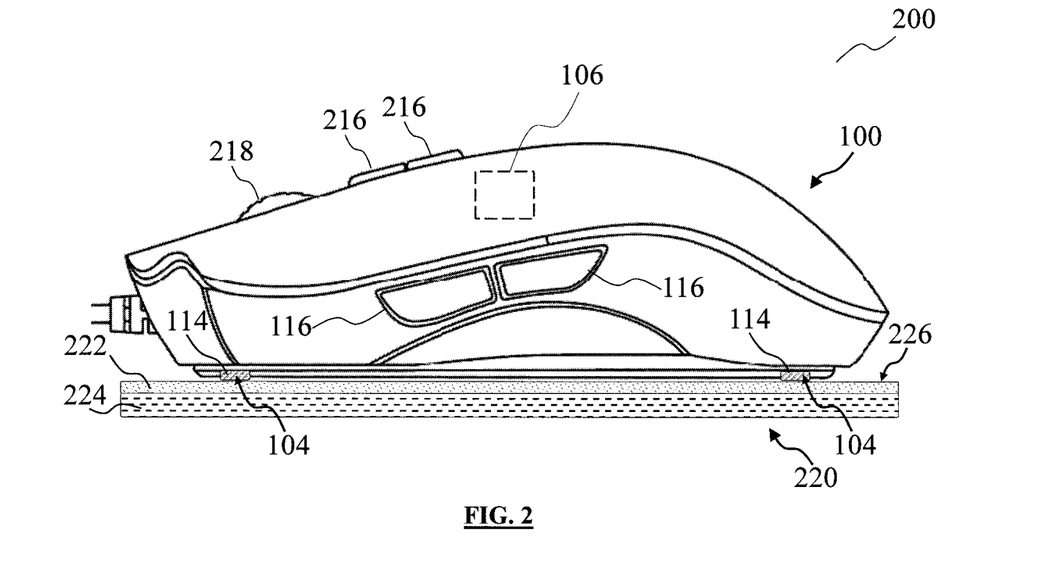
FIG. 2 shows a side view of a computer mouse arrangement according to various embodiments.

FIG. 2 shows a side view of a computer mouse arrangement 200 according to various embodiments. The computer mouse arrangement 200 may include the computer mouse 100 and a mouse pad 220. The side view shows that the computer mouse 100 may include a plurality of buttons 216 on the housing 102. The computer mouse 100 may also include a scroll wheel 218. The computer mouse 100 may be placed on the mouse pad 220 such that the mouse feet 114 may contact the mouse pad 220. The top surface of the mouse pad 220 may serve as a tracking surface 226, in other words, the displacement of the computer mouse 100 may be determined relative to the tracking surface 226 of the mouse pad 220. The computer mouse 100 may be displaced at least substantially parallel to the tracking surface 226, with the mouse feet 114 in contact with the tracking surface 226. The mouse pad 220 may include a ferromagnetic layer 224. The ferromagnetic layer 224 may include a ferromagnetic material such as an iron alloy or mild steel. The ferromagnetic layer 224 may be non-magnetized, except to be temporarily magnetised when it is in contact with a magnetic field. The mouse pad 200 may further include a protective layer 222 at least substantially covering the ferromagnetic layer 224. The protective layer 222 may provide the tracking surface 226 of the mouse pad 220. The protective layer 222 may include a thin non-ferromagnetic material such as paint, plastic coating or plastic film. The protective layer 222 may serve to improve the durability of the mouse pad 220, for example, it may protect the ferromagnetic layer 224 from atmospheric elements such as humidity. The protective layer 222 may also provide a desired texture, color or other aesthetic qualities. When the computer mouse 100 is placed on the mouse pad 220, the magnetic field of the magnetic elements 104 may temporarily magnetize the ferromagnetic layer 224 such that there is a magnetic attraction force between the bottom surface 110 of the computer mouse 100 and the mouse pad 220. The magnetic attraction force may mimic the effect of gravity, in other words, increasing the magnetic attraction force may make the computer mouse 100 appear "heavier" to a user. When the magnetic attraction force is increased, a larger force may be required to move the computer mouse 100 across the tracking surface 226, i.e. to move the computer mouse 100 in a direction at least substantially parallel to the tracking surface 226. In other words, increasing the magnetic attraction force may increase the glide force threshold. The magnetic element 104 may be an electromagnetic element which may possess a magnetic field when an electric current runs through the magnetic element 104. Alternatively, the magnetic element 104 may be an electro-permanent magnet, which may be a permanent magnet which has a magnetic field that can be switched on or off by an electric current pulse. The magnetic field strength of the magnetic element 104 may be varied, by controlling an electric current provided to the magnetic element 104. Varying the magnetic field strength of the magnetic element 104 may accordingly vary the magnetic attraction force between the magnetic element 104 and the ferromagnetic layer 224. The magnetic attraction force may be directly proportional to the amount of glide force required for moving the computer mouse 100 over the mouse pad 220. The pressure-sensitive sensors 118 may provide feedback to the control circuit 106, for adjusting the magnetic attraction force. The control circuit 106 may decrease the magnetic attraction force if the pressure-sensitive sensors 118 indicate that the force pulling the computer mouse 100 towards the mouse pad 220 is too large.

According to various embodiments, the mouse feet 114 may be integrally fabricated together with the housing 102. Alternatively, the mouse feet 114 may be fabricated separately from the housing 102 and may be coupled to the housing 102. The mouse feet 114 may be detachable from the housing 102, in other words, the mouse feet 114 may be removable. A user may detach the mouse feet 114 from the housing 102 and couple new mouse feet 114 to the housing 102. The mouse feet 114 may be removably coupled to the housing 102, for example, the mouse feet 114 may include a coupling member that may be interlocked with the housing 102. Alternatively, the mouse feet 114 may be removably adhered to the base of the housing 102.

Figure 3:
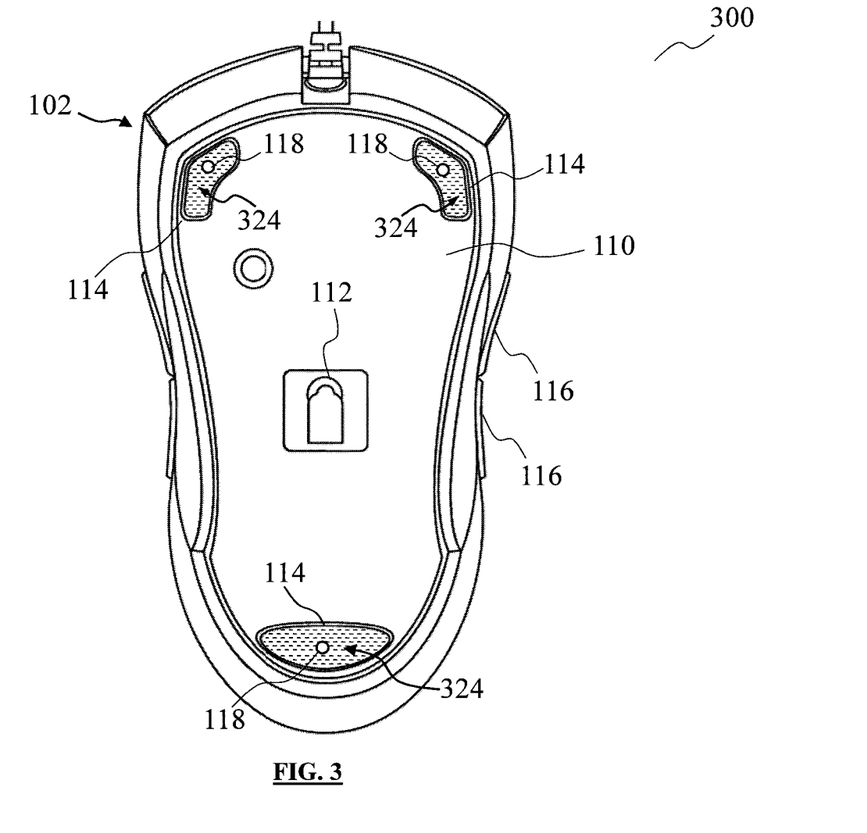
FIG. 3 shows a bottom view of a computer mouse according to various embodiments.

FIG. 3 shows a bottom view of a computer mouse 300 according to various embodiments. The computer mouse 300 may be similar to the computer mouse 100, except that the mouse feet 114 may include a ferromagnetic material 324 that is unmagnetized, instead of a magnetic element 104. The ferromagnetic material 324 may cover at least substantially an entire surface of the mouse feet 114, or may be smaller than the mouse feet 114. The ferromagnetic material 324 may also be arranged on the bottom surface 110 or embedded into the bottom surface 110.

Figure 4:
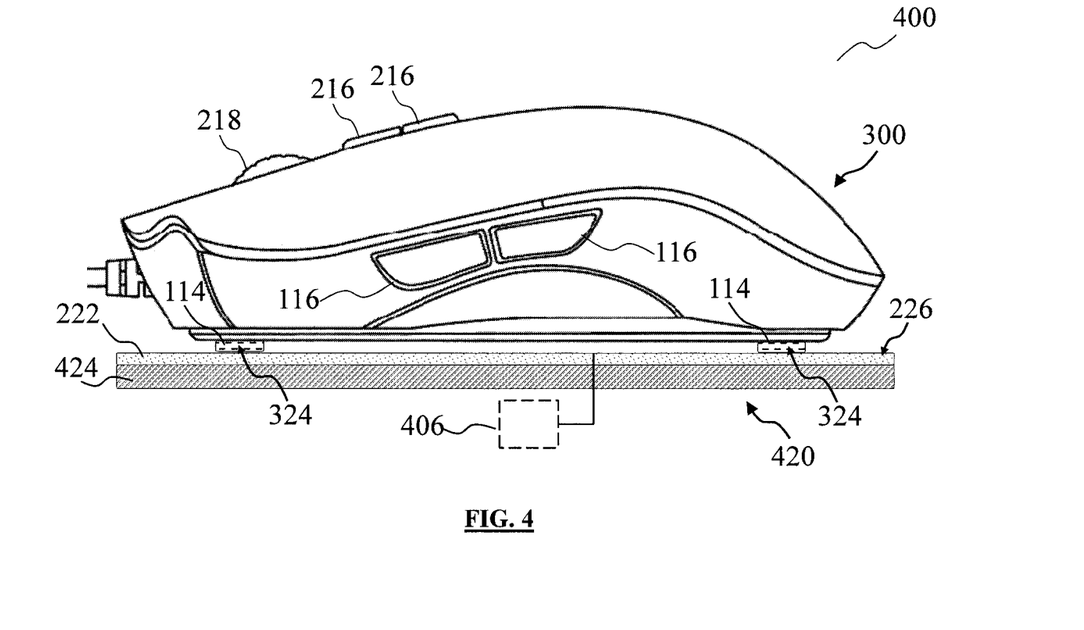
FIG. 4 shows a side view of a mouse pad arrangement according to various embodiments.

FIG. 4 shows a side view of a mouse pad arrangement 400 according to various embodiments. The mouse pad arrangement 400 may include the computer mouse 300 and a mouse pad 420. The mouse pad 420 may be similar to the mouse pad 220, except that it may include a magnetic layer 424 instead of the ferromagnetic layer 224. The magnetic layer 424 may include at least one of electromagnets or electro-permanent magnets. The magnetic field strength of the magnetic layer 424 may be varied, by controlling an electric current provided to the magnetic layer 424. The magnetic field strength of the magnetic layer 424 may be varied to adjust the magnetic attraction force between the magnetic layer 424 and the ferromagnetic material of the mouse feet 114. The magnetic attraction force may be directly proportional to the glide force required for moving the computer mouse 300 over the tracking surface 226 of the mouse pad 420. The mouse pad 420 may further include a control circuit 406 configured to control the magnetic attraction force. The control circuit 406 may control the magnetic attraction force by controlling the electric current provided to the magnetic layer 424.

According to various embodiments, a user may adjust the glide force threshold of the computer mouse 100 or 300, for example, via a user interface. The user interface may be provided on the computer mouse 100 or 300, for example, as one of the buttons 116, 216 or through the scroll wheel 218. The user interface may also be provided on the mouse pad 220 or 420, for example, as a button, a button, a keypad or a knob. The user interface may also be provided on a computing device coupled to the computer mouse 100 or 300, for example, as a graphical user interface. The graphical user interface may allow the user to directly input his desired glide force threshold. The graphical user interface may also allow the user to configure the functionality of the user interface on the computer mouse or the mouse pad for adjusting the glide force threshold. For example, the user may use the graphical user interface to configure a first side button of the computer mouse to be used for increasing the glide force threshold and to configure a second side button of the computer mouse to be used for decreasing the glide force threshold. The user may download a pre-configured glide force threshold into one of the computer mouse or the mouse pad, via a software loaded onto the computing device. When the user adjusts the glide force threshold through the user interface, a user command signal may be provided to the control circuit. The control circuit may vary the magnetic attraction force between the computer mouse and the mouse pad, based on the user command signal. The effect of varying the magnetic attraction force may be similar to varying the weight of the computer mouse. When the weight of the computer mouse is increased, the inertial force of the computer mouse is also increased. Similarly, when the magnetic attraction force is increased, the computer mouse may require a larger external force to be applied to change the velocity of the computer mouse. The user may adjust the glide force threshold on-the-fly. For example, the user may increase the glide force threshold for more control on the computer mouse movement or may reduce the glide force threshold to have a faster gliding speed. As an example, when the user needs to make quick successive clicks on a small area shown on a display of a computing device, the user may prefer the computer mouse to feel "heavy" such that the computer mouse remains stationary when the user depresses any of the buttons 116, 216 or the scroll wheel 218. If the glide force threshold is too low, the computer mouse may shift in position as a result of the quick successive clicks, causing the user to click on a wrong position on the display.

According to various embodiments, a computer application may be configured to adjust the glide force threshold automatically based on events in the computer application. The computer application may be run on a computing device coupled to the computer mouse 100 or 300, or the mouse pad 220 or 420. The computing device may be coupled to the computer mouse or the mouse pad via a connector interface, such as Universal Serial Bus, IEEE 1394 or PS/2 port. The computing device may alternatively, or additionally, be coupled to the computer mouse or the mouse pad via a wireless communication protocol, such as Wi-Fi, Bluetooth, infrared, or internet. The computer application may transmit an application instruction signal to a control circuit residing in either the computer mouse or the mouse pad, to control the magnetic attraction force based on events in the computer application. The computer mouse or the mouse pad may receive the application instruction signal via a communication module residing in the computer mouse of the mouse pad. The communication module may be configured to relay the application instruction signal to the control circuit, or may be configured to translate the application instruction signal into a format that is readable by the control circuit. The control circuit may thereby control the magnetic attraction force between the computer mouse and the mouse pad, for example, by varying an amount of electric current provided to magnetic elements in either the computer mouse or the mouse pad. As an example, the computer application may be a computer game. A user may execute various different functions in the computer game, depending on a game scenario. For example, when a target appears in the computer game, the user may select a "sniping" function which simulates the use of a sniper rifle to aim and shoot at the target from a long range. When the "sniping" function is selected, the user may rotate the scroll wheel of the computer mouse to perform a "zoom-in" function which simulates zooming in on the target using the telescopic sight of the sniper rifle. The computer mouse or the mouse pad may be pre-programmed to trigger a high glide force threshold when the "zoom-in" function is called up in the computer game, so that the user may experience a better stability in performing the zoom-in function, for example the computer mouse may not move across the mouse pad when the user rotates the scroll wheel. The control circuit may vary the magnetic attraction force based on at least one of the events in the computer application and the inputs received on the user interface. For example, the user may perform the "zoom-in" function in the computer game by operating the right-click button. The computer application may be configured to send an application instruction signal to the control circuit for increasing the magnetic attraction force, when the event of "sniping" coincides with the event of "zoom-in". Alternatively, the user interface may be configured to send a user command signal to the control circuit for increasing the magnetic force, when the right-click button is operated. Yet alternatively, each of the user interface and the computer application may send their respective user command signal and application instruction signal to the control circuit. The control circuit may be configured to vary the magnetic attraction force based on a combination of the user command signal and the application instruction signal, for example the control circuit may be configured to increase the magnetic attraction force when the right-click button is operated in conjunction with the "sniping" event in the computer application. A memory within one of the computer mouse, the mouse pad or the computing device may store configuration settings. The configuration settings may include at least one of correlation between user inputs provided through the user interface and the glide force threshold, correlation between computer application events and the glide force threshold or correlation between a position of a mouse cursor and the glide force threshold. The configuration settings may also be associated with the user's identity, for example, a user profile, so that each user may access their preferred configuration settings. The user may configure the configuration settings via software loaded on the computing device, or may download the configuration settings from an online database. The control circuit may be further configured to vary the magnetic attraction force based on the configuration settings.

Figure 5:
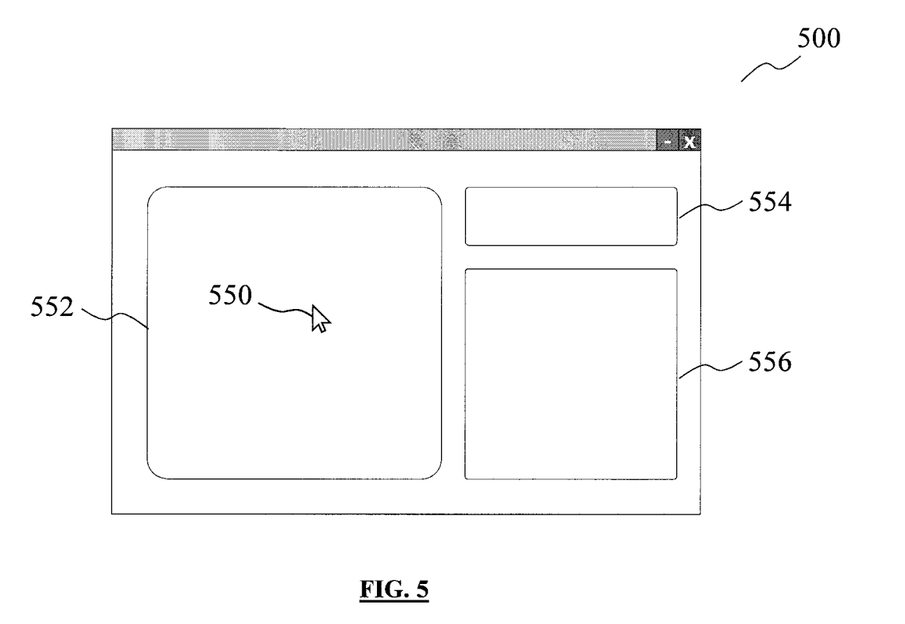
FIG. 5 shows a graphical user interface on a display of a computing device.

FIG. 5 shows a graphical user interface 500 on a display of a computing device. According to various embodiments, a control circuit may vary a magnetic attraction force between a computer mouse and a mouse pad based on a position of a pointer 550 (in other words: mouse cursor) in the graphical user interface 500. The control circuit may reside in either the computer mouse or the mouse pad. The graphical user interface 500 may include a plurality of sections or areas. As an illustrative, non-limiting example, the graphical user interface 500 may include a first section 552, a second section 554 and a third section 556. The magnetic attraction force may increase when the pointer 550 reaches the edge of any one of the first section 552, the second section 554 or the third section 556. The increase in magnetic attraction force may serve as a force feedback mechanism, to inform the user that the pointer 550 is nearly outside of the sections. Any one of the first section 552, second section 554 or third section 556 may represent a pre-programmed tracking area. The increase in magnetic attraction force may warn the user that the pointer 550 is reaching the edge of the pre-programmed tracking area. The movement of the cursor may be limited to the pre-programmed tracking area or the computer mouse movement may only be tracked within the tracking area. Each section may also be associated with a different level of magnetic attraction force, for example, to suit the different functions that may be executed in each section. As an illustrative example, the first section 552 may display a game avatar where the pointer 550 is used to move the game avatar forward. The desired glide force threshold may be low so that the user can easily and quickly move the game avatar. The second section 554 may be a weapon selection window and the desired glide force threshold for the weapon selection may be normal—the selection process requires neither a fine controlled movement nor a quick movement. The third section 556 may display a simulation of a weapon sight, showing the target. The user may use the computer mouse to aim at the target or to zoom in at the target. The desired glide force threshold in the third section may be high, so as not to miss the target when the user inevitably causes minuscule movements to the computer mouse. A memory in the computing device, the computer mouse or the mouse pad may store configuration settings that correlate the position of the pointer 550 and the desired glide force threshold. The memory storing the configuration settings may also reside on a computing cloud or a remote server. The computing device, the computer mouse or the mouse pad may download the configuration settings from the computing cloud or the remote server. The computing device may be directly coupled to the computer mouse or the mouse pad via a connector interface, such as Universal Serial Bus, IEEE 1394 or PS/2 port. The computing device may alternatively, or additionally, be coupled to the computer mouse or the mouse pad via a wireless communication protocol, such as Wi-Fi, Bluetooth, infrared, or internet. The computer application may provide the configuration settings, or the user may manually configure the configuration settings. The control circuit may vary the magnetic attraction force between the computer mouse and the mouse pad based on the configuration settings.

Figure 6:
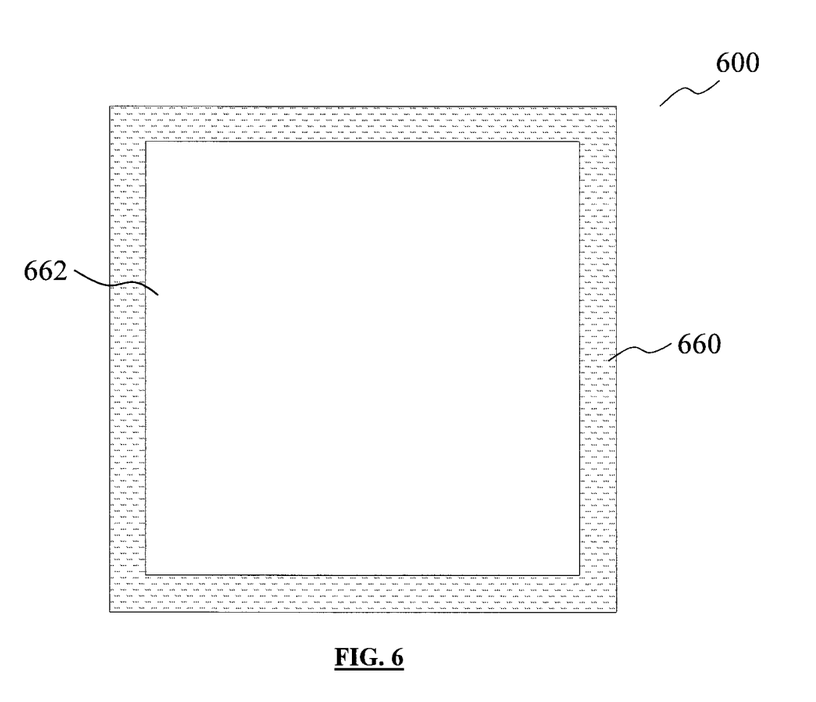
FIG. 6 shows a top view of a mouse pad according to various embodiments.

FIG. 6 shows a top view of a mouse pad 600 according to various embodiments. The mouse pad 600 may be similar to the mouse pad 420, in that it may include a magnetic layer 660 which may include the same magnetic materials as the magnetic layer 424. The mouse pad 600 may also include the protective layer 222. The magnetic layer 660 may be arranged only at the periphery or at the edges of the mouse pad 600. The mouse pad 600 may be used together with the computer mouse 300. When the computer mouse 300 is at the non-periphery area 662 of the mouse pad 600, no magnetic force is generated between the computer mouse 300 and the mouse pad 600. When the computer mouse 300 is at the periphery area of the mouse pad, the magnetic layer 660 may provide a magnetic attraction force between the computer mouse 300 and the magnetic layer 660. The magnetic attraction force may serve as a force feedback to inform the user that the computer mouse 300 is close to the edge of the mouse pad 600, so that the user may know when to re-position the computer mouse 300 to the non-periphery area 662 of the mouse pad 600. Alternatively, the magnetic layer 660 may be shaped to form other designs, for example to demarcate parts of the mouse pad 600. For example, the mouse pad 600 may include a first section and a second section. The first section may include the magnetic layer 660 while the second section may be free from the magnetic layer 660. The user may place the computer mouse 300 on the first section when a high glide force threshold is desirable, or shift the computer mouse 300 to the second section when a low glide force threshold is desirable.

Figure 7:
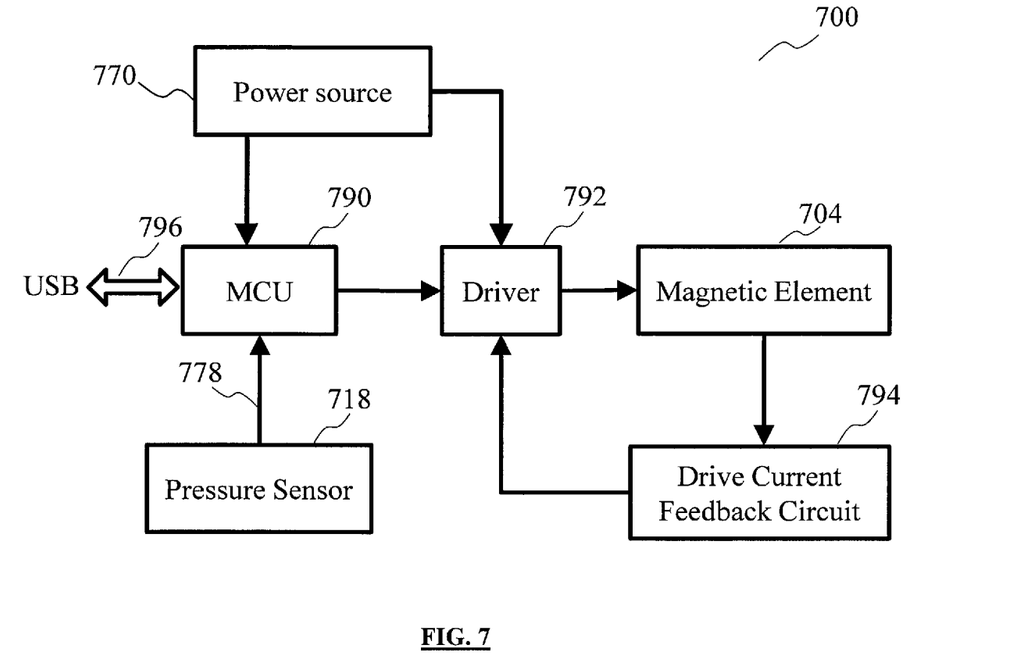
FIG. 7 shows a block diagram of an electric circuit of at least one of a computer mouse or a mouse pad according to various embodiments.

FIG. 7 shows a block diagram 700 of an electric circuit of at least one of a computer mouse or a mouse pad according to various embodiments. The electric circuit may include a power supply 770 and a magnetic element 704. The power source 770 may be configured to supply electric current to the magnetic element 704, through a control circuit. The power source 770 may supply a direct current (DC) or an alternating current (AC). The power source 770 may be a battery. The power source 770 may alternatively be a Universal Serial Bus (USB) power cable. The magnetic element 704 may be identical to, or similar to the magnetic element 104 or the magnetic layer 424. The magnetic element 704 may be an electromagnet or an electro-permanent magnet. The magnetic element 704 may generate a magnetic field when it receives an electric current. The magnetic field strength of the magnetic element 704 may be proportional to the magnetic attraction force between the computer mouse and the mouse pad, and thereby be proportional to the glide force threshold of the computer mouse. The electric circuit may further include a control circuit. The control circuit may be identical to, or similar to, the control circuit 106 or the control circuit 406. The control circuit may include a microcontroller unit (MCU) 790 and a driver 792. The power source 770 may supply electric current to each of the MCU 790 and the driver 792. The driver 792 may adjust the electric current received from the power source 770, to provide an adjusted electric current to the magnetic element 704. The electric circuit may further include a drive current feedback circuit 794. The driver current feedback unit 794 may be configured to receive a magnetic element signal and may be further configured to control the driver 792 based on the magnetic element signal. The magnetic element signal may be indicative of the magnetic field strength of the magnetic element 704. The driver current feedback unit 794 may control the driver 792 so as to adjust an amount of electrical current supplied to the magnetic element 704. For example, when the drive current feedback circuit 794 determines that the magnetic field strength of the magnetic element 704 has exceeded a desired magnetic field strength, the driver current feedback circuit 794 may control the driver 792 to reduce the electric current supplied to the magnetic element 704. The MCU 790 may communicate with a computing device or a user interface, through a data channel 796. The user interface may be a button, a key, a slider, a scroll wheel or any other type of input mechanism provided on either the computer mouse or the mouse pad. The data channel 796 may be provided by, for example, a USB data cable. The MCU 790 may receive user command signals through the data channel 796. The user command signal may convey an instruction or command provided by a user to adjust the glide force threshold. The electric circuit may further include a pressure sensor 718. The pressure sensor 718 may be identical to, or similar to, the pressure-sensitive sensors 118 arranged at the mouse feet. The sensor 71 may be configured to provide a pressure feedback signal 778 to the MCU 790, based on an amount of pressure exerted on the mouse feet or the mouse pad. The MCU 790 may be configured to control the driver 792, based on at least one of the pressure feedback signal 778, the user command signal. The driver 792 may include a variable resistive element. The driver 792 may adjust the electric current provided to the magnetic element 704, by varying the resistance of the variable resistive element. The driver 792 may further include a switch connected in series with the magnetic element 704. The driver 792 may disconnect the magnetic element 704 from the electric circuit, by opening the switch. The magnetic element 704 may lose its magnetic field when the switch is opened, if it is an electromagnet.

According to various embodiments, the power source 770 may be configured to supply an AC to the magnetic element 704. An alternating current may be less likely to permanently magnetizing a ferromagnetic material, for example the ferromagnetic layer 224 of a mouse pad, as compared to a direct current.

Figure 8A:
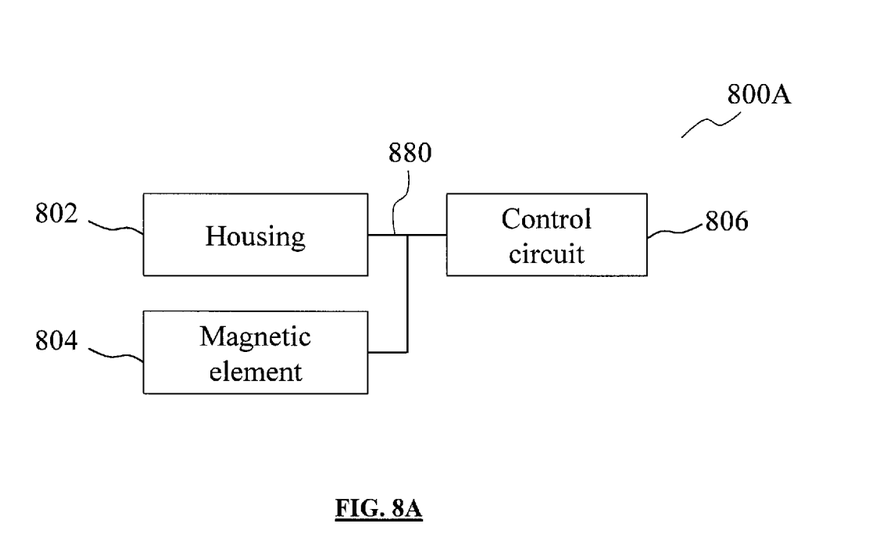
FIG. 8A shows a conceptual diagram of a computer mouse according to various embodiments.

FIG. 8A shows a conceptual diagram of a computer mouse 800A according to various embodiments. The computer mouse 800A may be placed on a tracking surface and the computer mouse 800A may be movable relative to the tracking surface. The computer mouse 800A may include a housing 802, a magnetic element 804 and a control circuit 806. The magnetic element 804 may be provided on the housing 802. The control circuit 806 may be configured to control a magnetic attraction force between the magnetic element 804 and a ferromagnetic material on the tracking surface.

In other words, according to various embodiments, the computer mouse 800A may be identical to, or similar to, the computer mouse 100. The tracking surface may be identical to, or similar to, the mouse pad 220. The tracking surface may include a ferromagnetic material that may be unmagnetized and may further include a non-ferromagnetic protective layer over the ferromagnetic material. The computer mouse 800A may be coupled to a computing device running an application. The computer mouse 800A may be glided along the tracking surface to control the position of a pointer within a graphical user interface displayed on the computing device display. The housing 802 may be identical to, or similar to, the housing 102. The housing 802 may include a bottom surface that faces the tracking surface when the computer mouse 800A is glided along the tracking surface. The magnetic element 804 may be identical to, or similar to, the magnetic element 104 or the magnetic element 704. The magnetic element 804 may be arranged on the bottom surface, for example in at least one mouse foot extending out from the bottom surface. The at least one mouse foot may be identical to, or similar to the mouse feet 114. The magnetic element 804 may be one of an electromagnet or an electro-permanent magnet. The computer mouse 800A may include a plurality of magnetic elements 804 and the plurality of magnetic elements 804 may include both electromagnets and electro-permanent magnets. The control circuit 806 may be identical to, or similar to, the control circuit 106. The control circuit 806 may include a MCU 790 and a driver 792. The control circuit 806 may be configured to vary a magnetic field of the magnetic element 804, so as to control the magnetic attraction force between the magnetic element 804 and the ferromagnetic material on the tracking surface. The control circuit 806 may be configured to control the magnetic attraction force by controlling an amount of electric current provided to the magnetic element 804. The control circuit 806 may be configured to control the magnetic attraction force depending on at least one of the user's preferences, events in the application such as various different game scenarios, user actions in the application, or a position of the pointer in the graphical user interface. As such, the glide force threshold of the computer mouse 800A may be adjustable on-the-fly. The housing 802, the magnetic element 804 and the control circuit 806 may be coupled with each other, like indicated by lines 880, for example electrically coupled, for example using a line or a cable, and/or mechanically coupled.

Figure 8B:
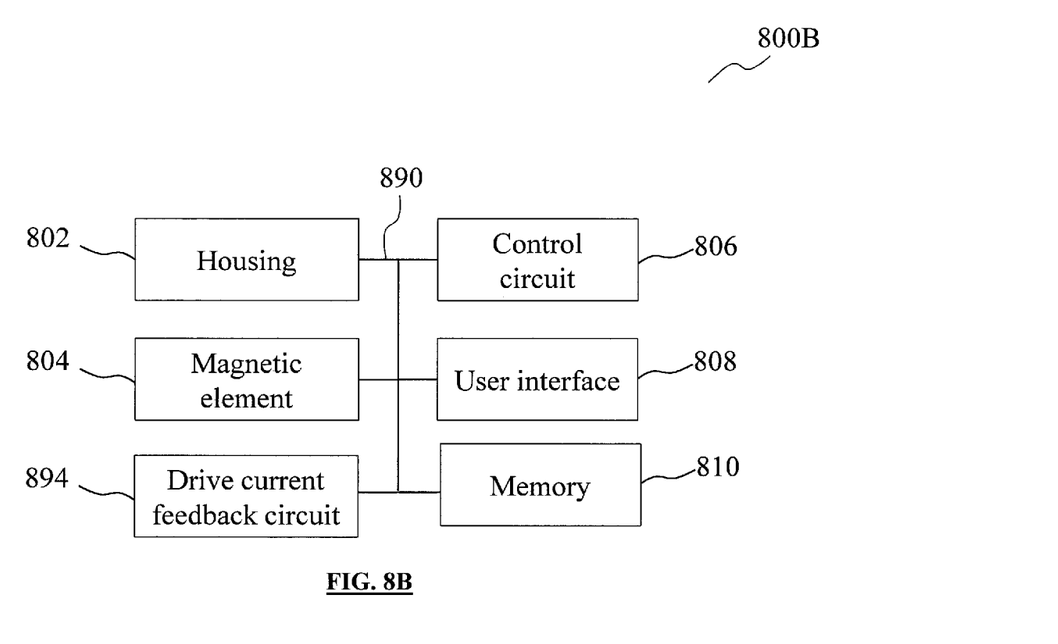
FIG. 8B shows a conceptual diagram of a computer mouse according to various embodiments.

FIG. 8B shows a conceptual diagram of a computer mouse 800B according to various embodiments. The computer mouse 800B may be similar to the computer mouse 800A in that it may also include a housing 802, a magnetic element 804 and a control circuit 806. The computer mouse 800B may further include a user interface 808. The user interface 808 may be configured to receive user inputs. The control circuit 806 may be configured to control the magnetic attraction force between the magnetic element 804 and the ferromagnetic material of the tracking surface based on the user inputs. The computer mouse 800B may be identical to, or similar to, the computer mouse 100. The user interface 808 may be one of a slider, a button, a keypad or a knob arranged on the housing 802. The user interface 808 may also be any one of the side buttons 116, the buttons 216 or the scroll wheel 218. The user interface 808 may be identical to, or similar to, the user interface 708. The computer mouse 800B may further include a memory 810. The memory 810 may be configured to store configuration settings. The configuration settings may include at least one of correlation between user inputs received through a user interface and the glide force threshold, correlation between a computer application and the glide force threshold or correlation between a position of a pointer in a graphical user interface and the glide force threshold. The computer mouse 800B may include a processor configured to download configuration settings from a computing cloud or a remote server, onto the memory 810. The memory 810 may be a non-volatile random-access memory. The housing 802, the magnetic element 804, the control circuit 806, the user interface 808 and the memory 810 may be coupled with each other, like indicated by lines 890, for example electrically coupled, for example using a line or a cable, and or mechanically coupled. The computer mouse 800B may further include a drive current feedback circuit 894 configured to adjust the magnetic attraction force between the magnetic element 804 and the ferromagnetic material, based on a reading of a magnetic field strength of the magnetic element 804. The drive current feedback circuit 804 may be identical to, or similar to, the drive current feedback circuit 794.

Figure 9:
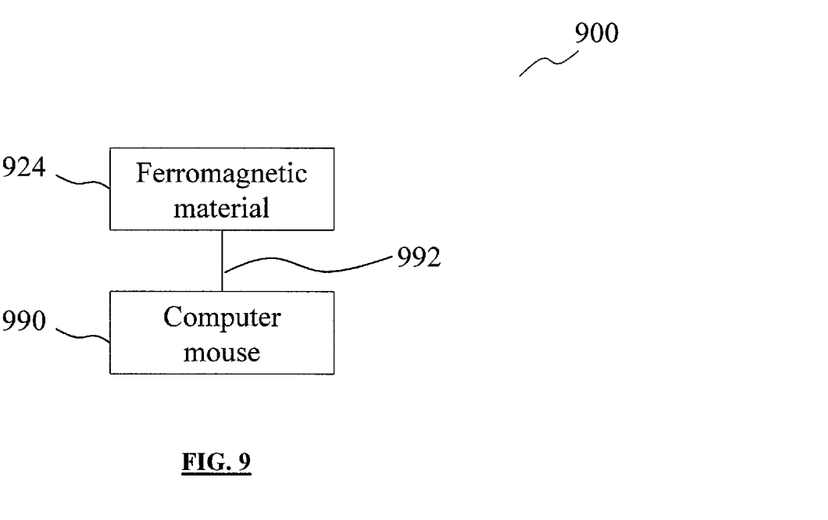
FIG. 9 shows a conceptual diagram of a computer mouse arrangement according to various embodiments.

FIG. 9 shows a conceptual diagram of a computer mouse arrangement 900 according to various embodiments. The computer mouse arrangement 900 may include a ferromagnetic material 924 and a computer mouse 990. The ferromagnetic material 924 may be provided on a tracking surface, such as a mouse pad. The computer mouse 990 may be placed on the tracking surface. The computer mouse 990 may be movable relative to the tracking surface. The computer mouse 990 may include a housing, a magnetic element provided on the housing, and a control circuit configured to control a magnetic attraction force between the magnetic element and the ferromagnetic material 924 on the tracking surface. The computer mouse arrangement 900 may be identical to, or similar to, the computer mouse arrangement 200. The computer mouse 990 may be identical to, or similar to, the computer mouse 100 or 800A or 800B. The tracking surface may be the mouse pad 220. The ferromagnetic material 924 may be provided in the ferromagnetic layer 224. The ferromagnetic material 924 and the computer mouse 990 may be coupled with each other, like indicated by lines 992, for example electrically coupled, for example using a line or a cable, and/or magnetically coupled, and/or mechanically coupled.

Figure 10A:
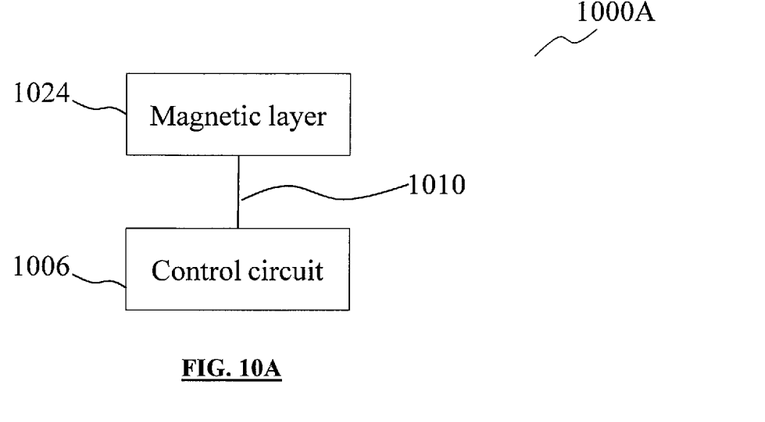
FIG. 10A shows a conceptual diagram of a mouse pad for arranging under a computer mouse, according to various embodiments.

FIG. 10A shows a conceptual diagram of a mouse pad 1000A for arranging under a computer mouse, according to various embodiments. The mouse pad 1000A may include a magnetic layer 1024 and a control circuit 1006. The control circuit 1006 may be configured to control a magnetic attraction force between the magnetic layer 1024 and a ferromagnetic material on a housing of the computer mouse. The control circuit 1006 may control the magnetic attraction force by controlling an amount of electric current provided to the magnetic layer 1024, which may include at least one of an electromagnet or an electro-permanent magnet. The mouse pad 1000A may be identical to, or similar to, the mouse pad 420 or 600. The computer mouse may be the computer mouse 300, and the ferromagnetic material on the housing of the computer mouse may be arranged at a surface of the housing facing the mouse pad 1000A when the computer mouse is placed on the mouse pad 1000A. The ferromagnetic material may be arranged in the mouse feet 114 of the computer mouse. The magnetic layer 1024 may be identical to, or similar to, the magnetic layer 424. The magnetic layer 1024 may be arranged at a periphery of the mouse pad 1000A. The magnetic layer 1024 and the control circuit 1006 may be coupled with each other, like indicated by lines 1010, for example electrically coupled, for example using a line or a cable, and/or mechanically coupled.

Figure 10B:
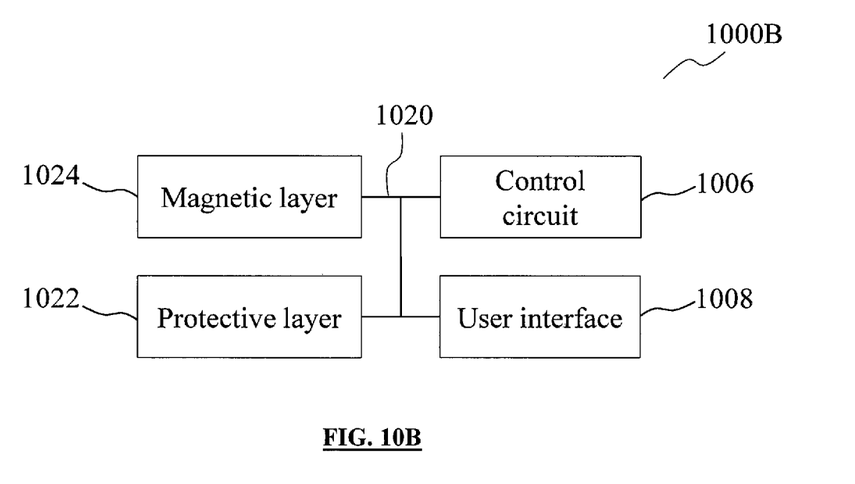
FIG. 10B shows a conceptual diagram of a mouse pad for arranging under a computer mouse, according to various embodiments.

FIG. 10B shows a conceptual diagram of a mouse pad 1000B for arranging under a computer mouse, according to various embodiments. The mouse pad 1000B may be similar to the mouse pad 1000A, in that it may also include a magnetic layer 1024 and a control circuit 1006. The mouse pad 1000B may further include a user interface 1008 and a protective layer 1022. The user interface 1008 may be configured to receive user inputs. The user interface 1008 may be one of a slider, a button, a keypad or a knob. The control circuit 1006 may be configured to control the magnetic attraction force based on the user inputs. The protective layer 1022 may be arranged over the magnetic layer 1024. The protective layer 1022 may be non-magnetic. The protective layer 1022 may be identical, or similar to the protective layer 222. The magnetic layer 1024, the control circuit 1006, the user interface 1008 and the protective layer 1022 may be coupled with each other, like indicated by lines 1020, for example electrically coupled, for example using a line or a cable, and/or mechanically coupled.

Figure 11:
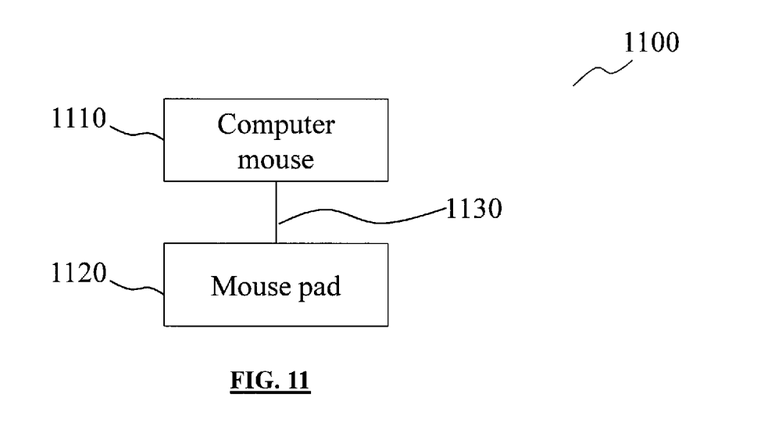
FIG. 11 shows a conceptual diagram of a mouse pad arrangement according to various embodiments.

FIG. 11 shows a conceptual diagram of a mouse pad arrangement 1100 according to various embodiments. The mouse pad arrangement 1100 may include a computer mouse 1110 and a mouse pad 1120. The computer mouse 1110 may include a housing and a ferromagnetic material on the housing. The mouse pad 1120 may be configured for arranging under the computer mouse 1110. The mouse pad 1120 may include a magnetic layer and a control circuit configured to control a magnetic attraction force between the magnetic layer and a ferromagnetic material on a housing of the computer mouse 1110. The mouse pad arrangement 1100 may be identical to, or similar to, the mouse pad arrangement 400. The computer mouse 1110 may be identical to, or similar to, the computer mouse 300. The mouse pad 1120 may be identical to, or similar to, the mouse pad 420 or 1000A or 1000B. The computer mouse 1110 and the mouse pad 1120 may be coupled with each other, like indicated by lines 1130, for example electrically coupled, for example using a line or a cable, and/or magnetically coupled, and/or mechanically coupled.

Figure 12A:
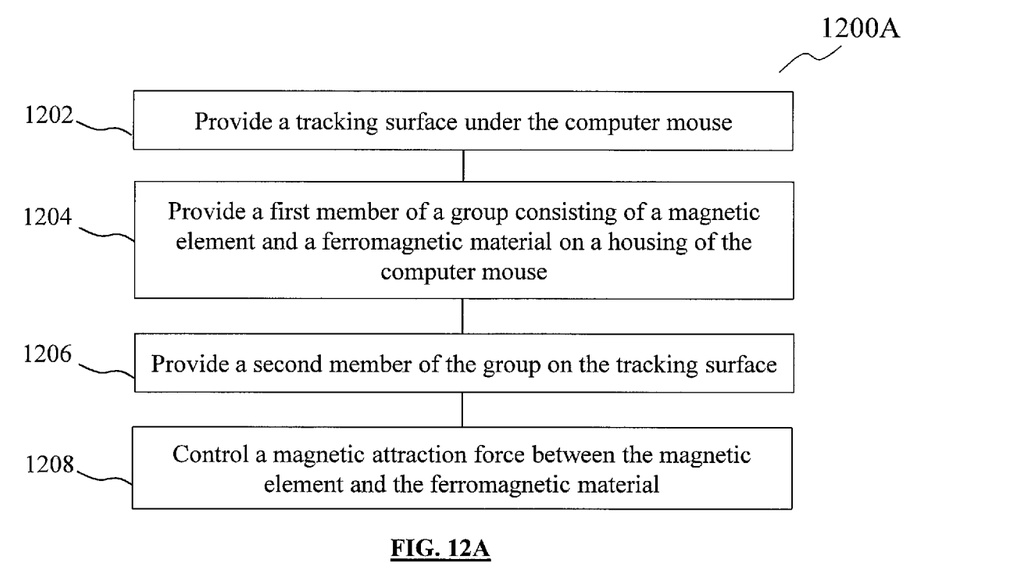
FIG. 12A shows a flow diagram of a method for adjusting a glide force threshold of a computer mouse, according to various embodiments.

FIG. 12A shows a flow diagram 1200A of a method for adjusting a glide force threshold of a computer mouse, according to various embodiments. In 1202, a tracking surface may be provided under the computer mouse. The tracking surface may be a mouse pad. In 1204, a first member of a group consisting of a magnetic element and a ferromagnetic material may be provided on a housing of the computer mouse. In 1206, a second member of the group may be provided on the tracking surface. In other words, if the magnetic element is provided on the housing of the computer mouse, the ferromagnetic material may be provided on the tracking surface and vice versa. The magnetic element may include at least one of an electromagnet or an electro-permanent magnet. In 1208, a magnetic attraction force between the magnetic element and the ferromagnetic material may be controlled.

Figure 12B:
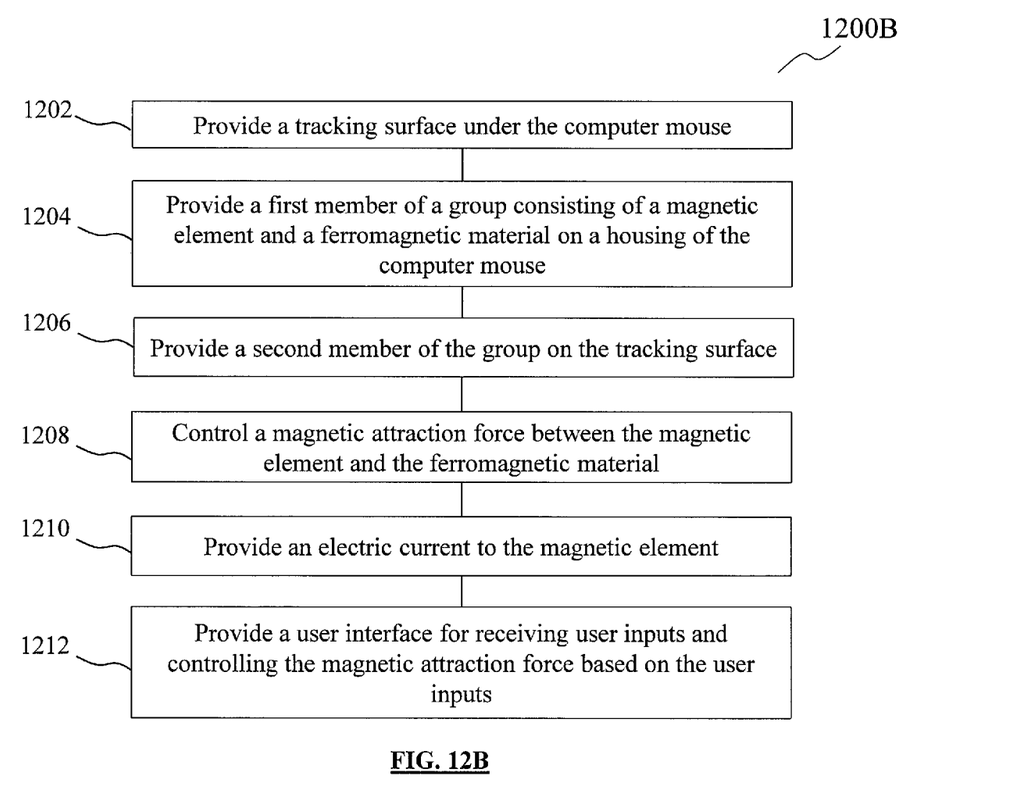
FIG. 12B shows a flow diagram of a method for adjusting a glide force threshold of a computer mouse, according to various embodiments.

FIG. 12B shows a flow diagram 1200B of a method for adjusting a glide force threshold of a computer mouse, according to various embodiments. The method may be similar to the method shown in the flow diagram 1200A, but may further include another two processes 1210 and 1212. In 1210, an electric current may be provided to the magnetic element. The electric current may be adjusted to control the magnetic attraction force. In 1212, a user interface for receiving user inputs may be provided and the magnetic attraction force may be controlled based on the user inputs. The user interface may be a physical input device provided on one of the computer mouse or the mouse pad. The user interface may also be a graphical user interface provided on a computing device coupled to the computer mouse.

According to various embodiments, a non-transitory computer-readable medium may be provided. The non-transitory computer-readable medium may store instructions which, when executed by a processor, makes the processor perform a method for adjusting a glide force threshold of a computer mouse. The method may include providing a tracking surface under the computer mouse, providing a first member of a group consisting of a magnetic element and a ferromagnetic material on a housing of the computer mouse; providing a second member of the group on the tracking surface; and controlling a magnetic attraction force between the magnetic element and the ferromagnetic material. The non-transitory computer-readable medium may be provided in any one of the computer mouse, the mouse pad or a computing device coupled to the computer mouse.

The following examples pertain to further embodiments.

Example 1 is a computer mouse movable relative to a tracking surface on which the computer mouse is placed, the computer mouse including: a housing; a magnetic element provided on the housing; and a control circuit configured to control a magnetic attraction force between the magnetic element and a ferromagnetic material on the tracking surface.

In example 2, the subject-matter of example 1 can optionally include that the control circuit is configured to control the magnetic attraction force by controlling an amount of electric current provided to the magnetic element.

In example 3, the subject-matter of example 1 or example 2 can optionally include that the magnetic element is one of an electromagnet or an electro-permanent magnet.

In example 4, the subject-matter of any one of examples 1 to 3 can optionally include a user interface for receiving user inputs, the control circuit configured to control the magnetic attraction force based on the user inputs.

In example 5, the subject-matter of example 4 can optionally include that the user interface is one of a slider, a button, a keypad or a knob arranged on the housing.

In example 6, the subject-matter of any one of examples 1 to 5 can optionally include that the computer mouse is coupled to a computing device running a computer application, wherein the control circuit is configured to control the magnetic attraction force based on events in the computer application.

In example 7, the subject-matter of any one of examples 1 to 6 can optionally include a memory configured to store configuration settings, the configuration settings including at least one of correlation between user inputs received through a user interface and the glide force threshold, correlation between a computer application and the glide force threshold or correlation between a position of a pointer in a graphical user interface and the glide force threshold.

In example 8, the subject-matter of any one of examples 1 to 7 can optionally include that the computer mouse is coupled to a computing device displaying a pointer within a graphical user interface, wherein the control circuit is configured to control the magnetic attraction force based on a position of the pointer in the graphical user interface.

In example 9, the subject-matter of any one of examples 1 to 8 can optionally include that the housing includes a bottom surface facing the tracking surface, wherein the magnetic element is arranged on the bottom surface.

In example 10, the subject-matter of example 9 can optionally include that the housing further includes at least one foot extending out from the bottom surface, wherein the magnetic element is arranged in the at least one foot.

In example 11, the subject-matter of any one of examples 1 to 10 can optionally include that the ferromagnetic material is non-magnetized.

In example 12, the subject-matter of any one of examples 1 to 11 can optionally include that the tracking surface includes a protective layer over the ferromagnetic material, the protective layer being non-ferromagnetic.

In example 13, the subject-matter of any one of examples 1 to 12 can optionally include a drive current feedback circuit configured to adjust the magnetic attraction force between the magnetic element and the ferromagnetic material based on a reading of a magnetic field strength of the magnetic element.

Example 14 is a computer mouse arrangement including: a ferromagnetic material on a tracking surface; and a computer mouse movable relative to the tracking surface on which the computer mouse is placed, the computer mouse including: a housing; a magnetic element provided on the housing; and a control circuit configured to control a magnetic attraction force between the magnetic element and the ferromagnetic material on the tracking surface.

In example 15, the subject-matter of example 14 can optionally include a user interface for receiving user inputs, the control circuit configured to control the magnetic attraction force based on the user inputs.

In example 16, the subject-matter of example 15 can optionally include that the user interface is one of a slider, a button, a keypad or a knob arranged on at least one of the housing or the tracking surface.

In example 17, the subject-matter of any one of examples 14 to 16 can optionally include that the ferromagnetic material is non-magnetized.

Example 18 is a mouse pad for arranging under a computer mouse, the mouse pad including: a magnetic layer; and a control circuit configured to control a magnetic attraction force between the magnetic layer and a ferromagnetic material on a housing of the computer mouse.

In example 19, the subject-matter of example 18 can optionally include a protective layer over the magnetic layer, the protective layer being non-magnetic.

In example 20, the subject-matter of example 18 or example 19 can optionally include that the control circuit is configured to control the magnetic attraction force by controlling an amount of electric current provided to the magnetic layer.

In example 21, the subject-matter of any one of examples 18 to 20 can optionally include that the magnetic layer includes at least one of an electromagnet or an electro-permanent magnet.

In example 22, the subject-matter of any one of examples 18 to 21 can optionally include a user interface for receiving user inputs, the control circuit configured to control the magnetic attraction force based on the user inputs.

In example 23, the subject-matter of example 22 can optionally include that the user interface is one of a slider, a button, a keypad or a knob.

In example 24, the subject-matter of any one of examples 18 to 23 can optionally include that the magnetic layer is arranged at a periphery of the mouse pad.

Example 25 is a mouse pad arrangement including: a computer mouse, including: a housing; and a ferromagnetic material on the housing; a mouse pad for arranging under the computer mouse, the mouse pad including: a magnetic layer; and a control circuit configured to control a magnetic attraction force between the magnetic layer and a ferromagnetic material on a housing of the computer mouse.

Example 26 is a method for adjusting a glide force threshold of a computer mouse, the method including: providing a tracking surface under the computer mouse; providing a first member of a group consisting of a magnetic element and a ferromagnetic material on a housing of the computer mouse; providing a second member of the group on the tracking surface; and controlling a magnetic attraction force between the magnetic element and the ferromagnetic material.

In example 27, the subject-matter of example 26 can optionally include that the magnetic element includes at least one of an electromagnet or an electro-permanent magnet.

In example 28, the subject-matter of example 26 or example 27 can optionally include providing an electric current to the magnetic element.

In example 29, the subject-matter of example 28 can optionally include that controlling the magnetic attraction force includes adjusting the electric current.

In example 30, the subject-matter of any one of examples 26 to 29 can optionally include that the tracking surface is a mouse pad.

In example 31, the subject-matter of any one of examples 26 to 30 can optionally include providing a user interface for receiving user inputs; and controlling the magnetic attraction force based on the user inputs.

In example 32, the subject-matter of example 31 can optionally include that providing the user interface includes providing a graphical user interface on a computing device coupled to the computer mouse.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced. It will be appreciated that common numerals, used in the relevant drawings, refer to components that serve a similar or the same purpose.

The invention claimed is:

1. A computer mouse movable relative to a tracking surface on which the computer mouse is placed, the computer mouse comprising:
a housing;
a magnetic element provided on the housing; and
a control circuit configured to control a magnetic attraction force between the magnetic element and a ferromagnetic material on the tracking surface;
wherein the housing comprises a bottom surface facing the tracking surface;
at least one foot extending out from the bottom surface; and
a pressure-sensitive sensor at the at least one foot, the pressure-sensitive sensor configured to determine a pressure exerted on the at least one foot;
wherein the control circuit is configured to control the magnetic force based on the pressure exerted on the at least one foot.

2. The computer mouse of claim 1, wherein the control circuit is configured to control the magnetic attraction force by controlling an amount of electric current provided to the magnetic element.

3. The computer mouse of claim 1, wherein the magnetic element is one of an electromagnet or an electro-permanent magnet.

4. The computer mouse of claim 1, further comprising:
a user interface for receiving user inputs, the control circuit configured to control the magnetic attraction force based on the user inputs.

5. The computer mouse of claim 4, wherein the user interface is one of a slider, a button, a keypad or a knob arranged on the housing.

6. The computer mouse of claim 1, wherein the computer mouse is coupled to a computing device running a computer application, wherein the control circuit is configured to control the magnetic attraction force based on events in the computer application.

7. The computer mouse of claim 1, further comprising:
a memory configured to store configuration settings, the configuration settings comprising at least one of correlation between user inputs received through a user interface and a glide force threshold, correlation between a computer application and the glide force threshold or correlation between a position of a pointer in a graphical user interface and the glide force threshold.

8. The computer mouse of claim 1, wherein the computer mouse is coupled to a computing device displaying a pointer within a graphical user interface, wherein the control circuit is configured to control the magnetic attraction force based on a position of the pointer in the graphical user interface.

9. The computer mouse of claim 1, wherein the magnetic element is arranged on the bottom surface or in the at least one foot.

10. The computer mouse of claim 1, wherein the ferromagnetic material is non-magnetized.

11. The computer mouse of claim 1, wherein the tracking surface comprises a protective layer over the ferromagnetic material, the protective layer being non-ferromagnetic.

12. The computer mouse of claim 1, further comprising:
a drive current feedback circuit configured to adjust the magnetic attraction force between the magnetic element and the ferromagnetic material based on a reading of a magnetic field strength of the magnetic element.

13. A computer mouse arrangement, comprising:
a ferromagnetic material on a tracking surface; and
a computer mouse movable relative to the tracking surface on which the computer mouse is placed, the computer mouse comprising:
a housing;
a magnetic element provided on the housing; and
a control circuit configured to control a magnetic attraction force between the magnetic element and the ferromagnetic material on the tracking surface;
wherein the housing comprises a bottom surface facing the tracking surface;
at least one foot extending out from the bottom surface; and
a pressure-sensitive sensor at the at least one foot, the pressure-sensitive sensor configured to determine a pressure exerted on the at least one foot;
wherein the control circuit is configured to control the magnetic force based on the pressure exerted on the at least one foot.

14. A mouse pad for arranging under a computer mouse, the computer mouse having at least one foot extending out from a surface of the computer mouse adapted to face the mouse pad and further having a pressure-sensitive sensor at the at least one foot, the pressure-sensitive sensor configured to provide a signal based on a pressure exerted on the at least one foot,
the mouse pad comprising:
a magnetic layer; and
a control circuit configured to control a magnetic attraction force between the magnetic layer and a ferromagnetic material on a housing of the computer mouse based on the signal provided by the pressure-sensitive sensor at the at least one foot of the computer mouse.

15. The mouse pad of claim 14, further comprising:
a protective layer over the magnetic layer, the protective layer being non-magnetic.

16. The mouse pad of claim 14, wherein the control circuit is configured to control the magnetic attraction force by controlling an amount of electric current provided to the magnetic layer;
wherein the magnetic layer comprises at least one of an electromagnet or an electro-permanent magnet.

17. The mouse pad of claim 14, further comprising:
a user interface for receiving user inputs, the control circuit configured to control the magnetic attraction force based on the user inputs.

18. The mouse pad of claim 14, wherein the magnetic layer is arranged at a periphery of the mouse pad.

19. The mouse pad of claim 14, wherein the mouse pad is coupled to a computing device running a computer application, wherein the control circuit is configured to control the magnetic attraction force based on events in the computer application.

* * * * *